(12) United States Patent
Dinkelacker

(10) Patent No.: US 6,345,284 B1
(45) Date of Patent: *Feb. 5, 2002

(54) EXTRACTION AND TAGGING CONTROL PALETTE

(75) Inventor: James Walter Dinkelacker, Los Altos, CA (US)

(73) Assignee: Netscape Communications Corporation, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,002

(22) Filed: Jun. 6, 1997

(51) Int. Cl.[7] .............................................. G06F 15/00
(52) U.S. Cl. ........................ 707/530; 707/500; 707/522; 707/531; 345/769; 345/770; 345/771
(58) Field of Search ................................ 707/501, 512, 707/530, 531, 539, 500, 522; 345/333, 351, 354, 769, 770, 771

(56) References Cited

U.S. PATENT DOCUMENTS

| | | | |
|---|---|---|---|
| 5,251,291 A | * 10/1993 | Malcolm | 707/539 |
| 5,361,342 A | * 11/1994 | Tone | 395/425 |
| 5,533,184 A | * 7/1996 | Malcolm | 395/161 |
| 5,692,129 A | * 11/1997 | Sonderegger et al. | 395/200.11 |
| 5,752,254 A | * 5/1998 | Sakairi | 707/530 |
| 5,828,376 A | * 10/1998 | Solimene et al. | 395/352 |
| 5,897,650 A | * 4/1999 | Nakajima et al. | 707/539 |
| 6,014,138 A | * 1/2000 | Cain et al. | 345/335 |
| 6,016,467 A | * 1/2000 | Newsted et al. | 704/9 |

OTHER PUBLICATIONS

Silicon Prairie Software, Clip Trakker, screen printouts, 1997.*
Michelle Shaw, Microsoft Office 6–in–1, pp. 50–53, 118, 234–235, 1994.*

* cited by examiner

Primary Examiner—Stephen S. Hong
Assistant Examiner—Cong-Lac Huynh
(74) Attorney, Agent, or Firm—Michael A. Glenn

(57) ABSTRACT

A user-configurable control palette for the extraction and tagging of highlighted objects where the user performs any desired task upon the objects. A control palette library is provided for the user to save custom palette layouts to and retrieve custom palette layouts from and allow the user to setup standard palettes for specific tasks such as document version control, training documents, interactive tutorials, survey questionnaires, interview forms, and on line testing. The user performs simplified extraction and tagging of highlighted objects from various sources through the control palette, changing each object's attributes such as font type, font style, font pitch, and color, through simple button clicks on the control palette. User defined tags or HTML tags may also be selected by the user to be associated with an object and the user may also specify links back to the source document for future reference. All of these operations are performed through the control palette and never affect the original object in the source file. Once the desired operations are performed on an object, the user selects a plurality of destination files where the modified object is written. The invention thus provides a system that is beyond the drag and drop concept, allowing the user to perform multiple operations upon an object through one control palette rather than through several different applications and utilities.

24 Claims, 6 Drawing Sheets

EXTRACTION AND TAGGING CONTROL PALETTE

BACKGROUND OF THE INVENTION

1. Technical Field

The invention relates to the extraction and tagging of data in a computer environment. More particularly, the invention relates to the extraction and tagging of highlighted objects on a computer display via a configurable control palette.

2. Description of the Prior Art

In the short history of computers, text editors have evolved from simple, rudimentary character manipulation programs to word processors, graphical and specialized (e.g. Hypertext Markup Language (HTML)) editors. The ability to manipulate text within the early text editors operated on a character by character basis. To make corrections in an existing document, the user had to select the line number that he wanted to edit, then find the beginning and ending character numbers that he wanted to replace or delete. He would then type in the characters that he wanted to insert into that line. This was a very cumbersome process which made document editing very painful and time consuming.

Full screen editors such as the Unix Visual Editor, VI, were later developed that allowed the user to mark the beginning and ending positions of a text block and manipulate that block. The concepts of block moves and cut and paste became popular with this generation of editors.

Many years later, along with the introduction of the mouse, the Apple Macintosh brought the drag and drop concept to the average user. Drag and drop was revolutionary at the time, it allowed the user to highlight text and simply drag it anywhere within his document. It also allowed the user to copy and paste the text to other applications within the computer. This was later applied to images and incorporated into word processors.

A specialized editor such as an HTML editor, allows the user to create specialized code and test the code within the application. Some HTML editors offer the same drag and drop capabilities as a word processor.

The common problem between all of these approaches is that highlighted text must be manipulated within the application itself. The alternative is to cut or copy, then paste the text into the destination application and manipulate it within the application. Manipulation consists of changing the text attributes such as font type, font style, font size, color or the placement of tags. The user typically inserts tags around the text by manually typing them or laboriously selecting them from certain menus under specific applications.

The drawback to performing the changes to the text in the destination application is that, once the desired changes to the text are performed, if the user wants the object placed in several different destination files, the user must repeatedly copy and paste the object into each destination file.

It would be advantageous to provide an extraction and tagging device that allows the user to manipulate and write highlighted objects to a plurality of destination files while preserving the integrity of the source file. It would further be advantageous to provide an extraction and tagging device that is easily operated and configured by users.

SUMMARY OF THE INVENTION

The invention provides an object extraction and tagging system. The invention utilizes an easily configurable control palette that allows the user to modify the attributes of an object without affecting the original object and thereby retaining the integrity of the source file. It further provides the user with a centralized, simplified system within which all of the desired operations upon an object are performed.

The control palette is easily configured by the user for any specific task the user desires. A control palette library is provided for the user to save custom palette layouts to and retrieve custom palette layouts from. Custom palette layouts allow the user to setup standard palettes for specific tasks such as document version control, training documents, interactive tutorials, market research surveys, and on-line testing.

The user performs simplified extraction and tagging of highlighted objects from various sources through the control palette. The user specifies changes to each object's attributes such as font type, font style, font pitch, and color, through simple button clicks on the control palette. User defined tags or HTML tags may also be selected by the user to be associated with an object. Additionally, the user may also specify links back to the source document for future reference.

All of these operations are performed through the control palette and never affect the original object in the source file. Once the desired operations are performed on the object, the user selects a plurality of destination files where the modified object is written. The invention thus provides a system that is beyond the drag and drop concept, allowing the user to perform multiple operations upon an object through one control palette rather than through several different applications and utilities.

DETAILED DESCRIPTION OF THE INVENTION

Figure 1:
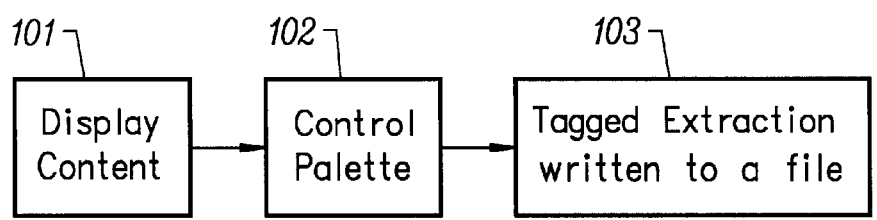
FIG. 1 is a block schematic diagram of the basic information flow of the extracted object process according to the invention.

Referring to FIG. 1, the invention provides a control palette 102 which operates upon the display content 101 that the user highlights. The control palette 102 modifies the display content 101 in whatever manner that the user specifies, then extracts and writes the tagged extraction 103 with the desired modifications to a file leaving the source object(s) in 101 unaffected.

Figure 2:
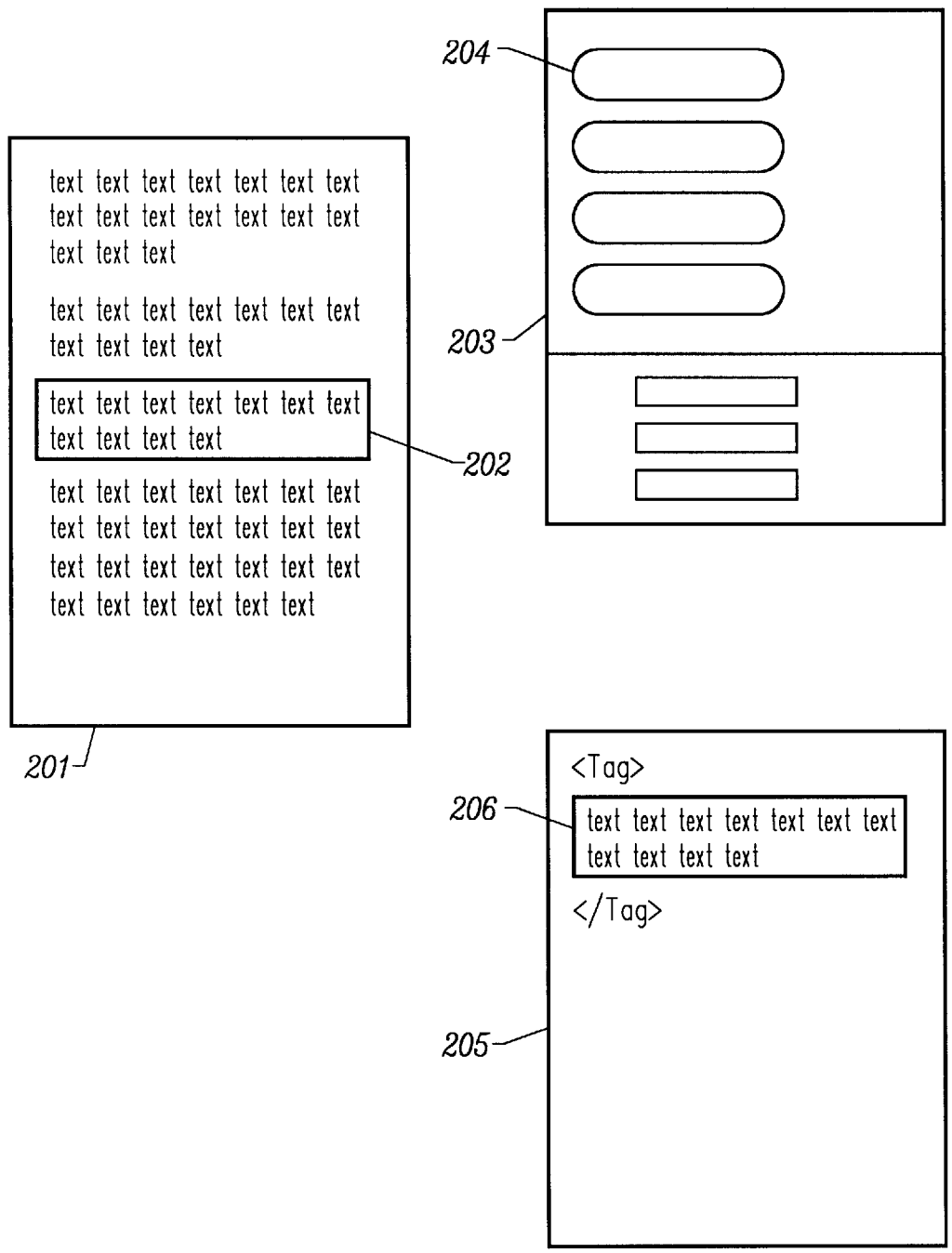
FIG. 2 is a block diagram of a source file, control palette and destination file according to the invention.

With respect to FIG. 2, a more detailed example of the process is presented wherein the source file 201 has a portion of text 202 that is highlighted. The user activates the control palette 203 with a selection of clickable choices 204. The highlighted text 202 is extracted by the control palette 203. The user clicks on the palette choices 204 to add tags or make modifications to the extracted text. When the user has completed all desired modifications to the extracted text, the tagged extraction 206 is written to the destination file 205. The writing of the objects to 206 may be immediately following a click on 204, or in other instances, multiple clicks may be performed.

Figure 3:
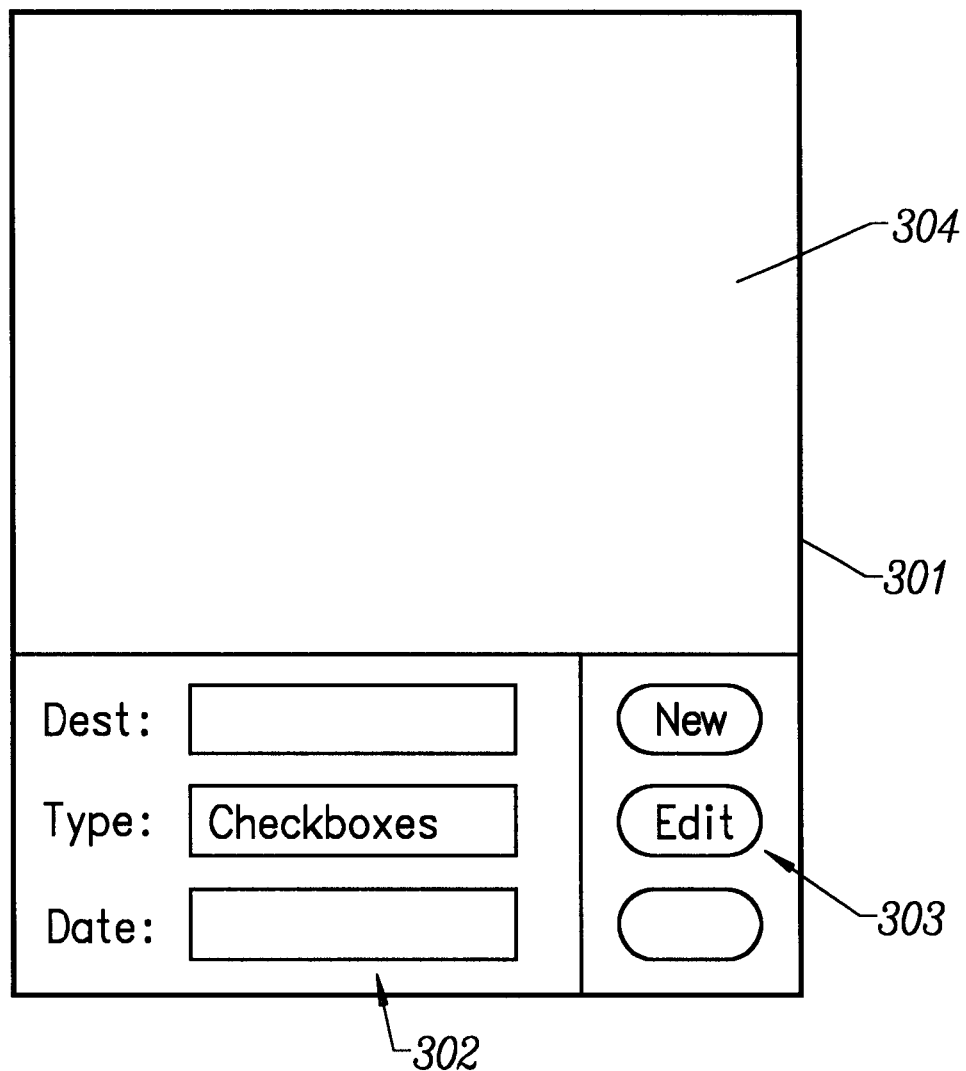
FIG. 3 is a schematic diagram of a control palette according to the invention.

Referring to FIG. 3, an example of a control palette 301 is shown. The control palette 301 contains an area for state information 302 where static information such as the destination file name, palette type and date or other attributes are displayed. Clickable buttons for palette editing 303 are also shown in this example. The palette editing buttons 303 allow the user to create custom clickable event choices 304 for any application that the user desires. The user can create events and configurable tags that are kept in libraries and provide a general tool that can be applied to anything that can be highlighted. The highlighted object can be text or a set of graphics that a user would, for example, want to identify for purposes of instructional content, version control, or to show only to particular audiences. Further, the highlighted object can be anything that can be tagged, whether it is an image, Tagged Image File Format (TIFF) file, Graphics Interchange Format (GIF) file, or a Java applet, for example.

The control palette is easily configurable and editable on the fly by the user. It allows the user to add a new button to perform a new function. It maintains libraries of its settings that are standard or are customized by the user. The settings are the equivalent of style sheets telling the control palette how to manipulate particular types of content and to reach particular destinations, thereby saving the user time and labor normally wasted on repetitive tasks. For example, if the user were interested in performing version control, there would be a set of events and with just a simple click on a radio button, the control palette will stick in a tag that has today's date and time in it.

Figure 4:
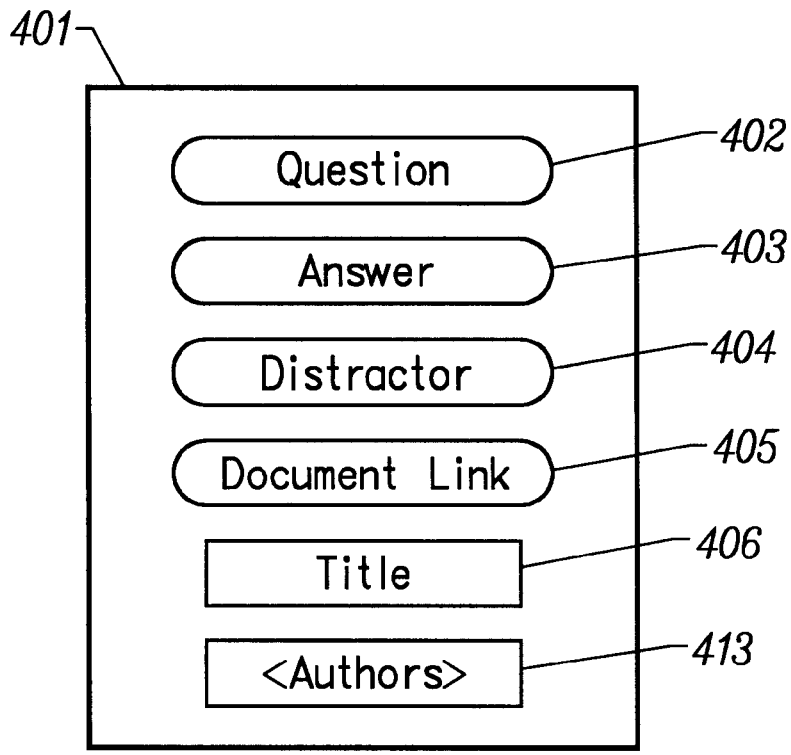
FIG. 4 is a schematic diagram of different variations of event buttons of a control palette according to the invention.
Figure 4:
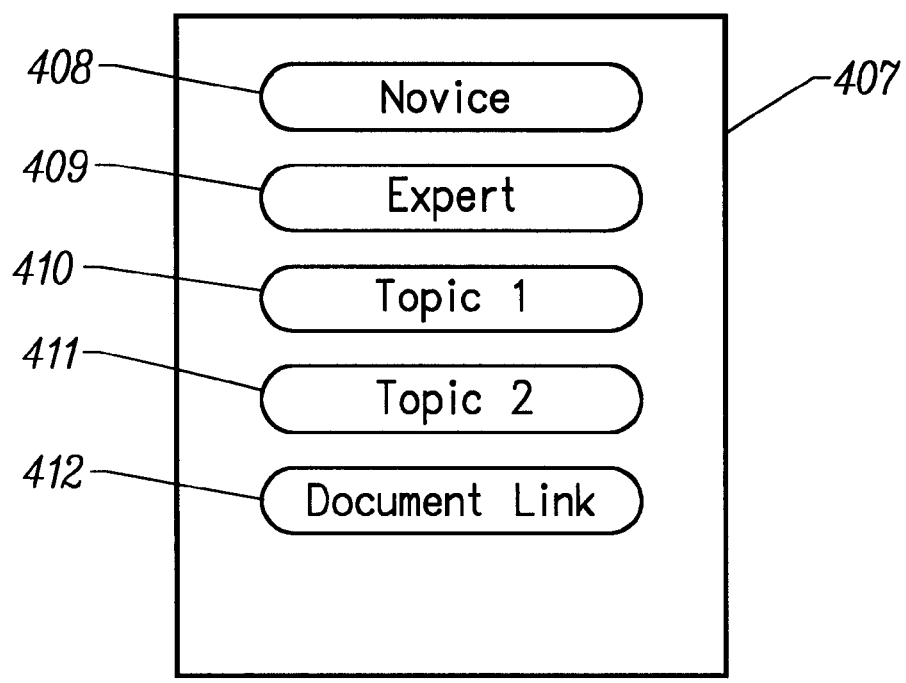

With respect to FIG. 4, a set of events for instructional content 401 is shown. Information can be simply tagged. For example, an instructional designer would browse through the on-line documentation for a company product. As the instructional designer reads through the documentation, he highlights particular objects and then clicks on the event on the control palette 401 to identify them as a test question 402. The control palette then tags them as a test question and writes the objects and tags to the destination file when the user has completed the task. The instructional designer then highlights another area of text and clicks on the event that identifies it as an answer 403. Several other areas of text are selected and the instructional designer clicks on the event that identifies them as distractors 404, or the incorrect answers. Additionally, each of these answers and distractors are easily tagged to link back 405 to the text in the original source document. This is useful to refresh the test taker's memory or for study purposes.

Links back to the original document are easily implemented because the control palette acts as a control center, knowing the name of the file that was opened and the byte locations of the highlighted object. Therefore, the file information can always be used to place tags in the destination file that link back to the original file.

The user can create events, in the same manner as shown above, that allow the highlighted text to be tagged to be shown only to particular audiences 407. A user could tailor the content of a document to present itself a little bit differently depending on whether the audience is an expert, an intermediate or a novice. Event buttons are created to specify that text is for the novice 408 or expert 409 level only. Clicking on one of the event buttons inserts user defined tags or Hypertext Markup Language (HTML) tags specifying that a paragraph, for example, is only meant for novices and is not displayed when an expert is viewing the document. Objects are also tagged to relate to specific topics 410, 411.

Tags may be custom tags defined by the user or HTML tags, for example. The tags can be customized for any application program or browser. An event can also be any attribute of text. The font type, font style, font pitch, or anything else along those lines, can be changed. Multiple destination files can also be specified in the control palette, allowing the simultaneous movement of annotated, marked or styled text to new locations. Also, editable text fields 413 can be used to insert specific text (e.g., an author's name) into the destination as well.

As an example of the flexibility of tags, product information has a very limited lifespan in the technical writing and technical publications arena. Product features sometimes change dramatically with each product revision. Some of this information can be classified as being very persistent across product versions and time, e.g. what a server is and how it works is information that infrequently changes.

In this case, the invention tags information that is specific to a product revision, relevant to all following revisions, or persistent across the product lifetime. Tags may be defined to create chapters, subchapters and paragraphs. The user can easily create these definitions and tag the text or other objects through the control palette. Text is highlighted and written to various destination documents with the ease of simple button clicks on the control palette. An editor is then able to bring up all of the information that pertains to a certain release or create a document for a customer. Specific information can be added, deleted, replaced, or printed using different granularities of tag classifications.

Figure 5:
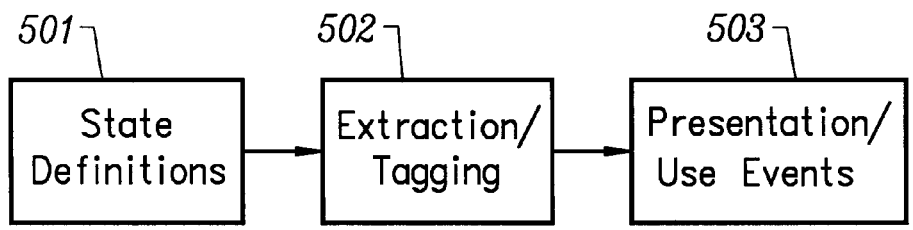
FIG. 5 is a block schematic diagram showing the logical stages that must take place in the object modification process the according to the invention.

With respect to FIG. 5, the state definitions 501 such as source filename and palette type are set by the user before the extraction and tagging stage 502 is executed. Once the user -completes the task of extracting and tagging the desired objects, the finalized, modified tagged object is available for presentation 503. The presentation/use events stage 503 is where a browser or application program interprets and displays whatever tags and attributes that have been applied to the object.

Figure 6:
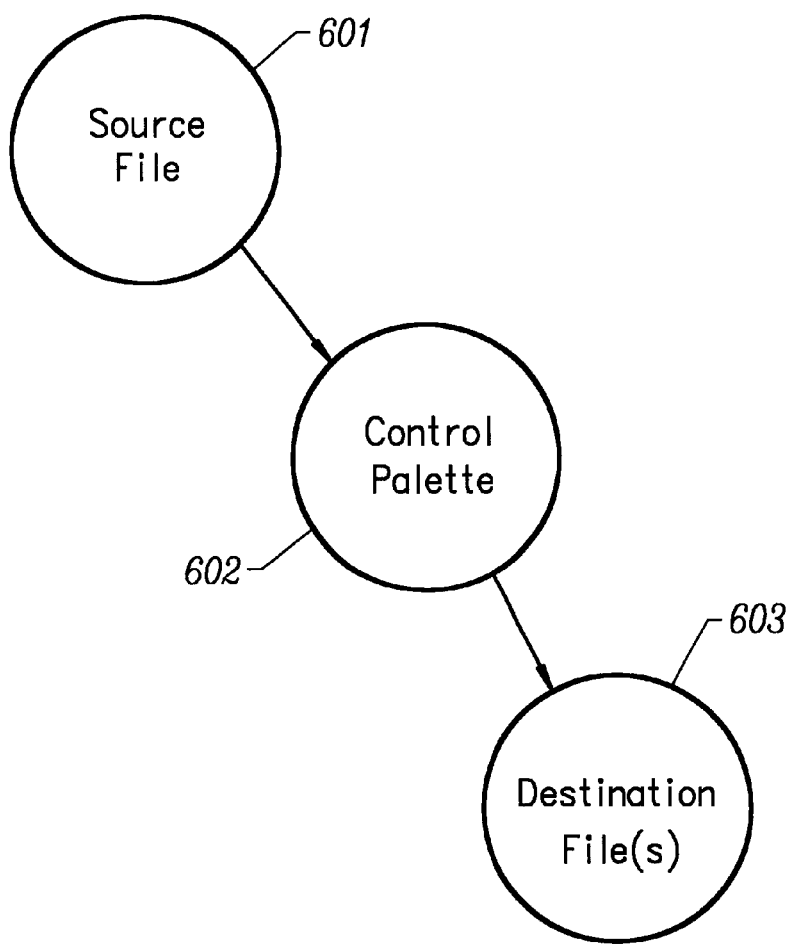
FIG. 6 is a block schematic diagram showing the data flow from the source file to a destination file according to the invention.

Referring to FIG. 6, in a preferred embodiment of the invention, the Control Palette 602 reads the highlighted object from the source file 601. The Control Palette 602 writes the tagged and modified information to the destination file(s) 603.

Figure 7:
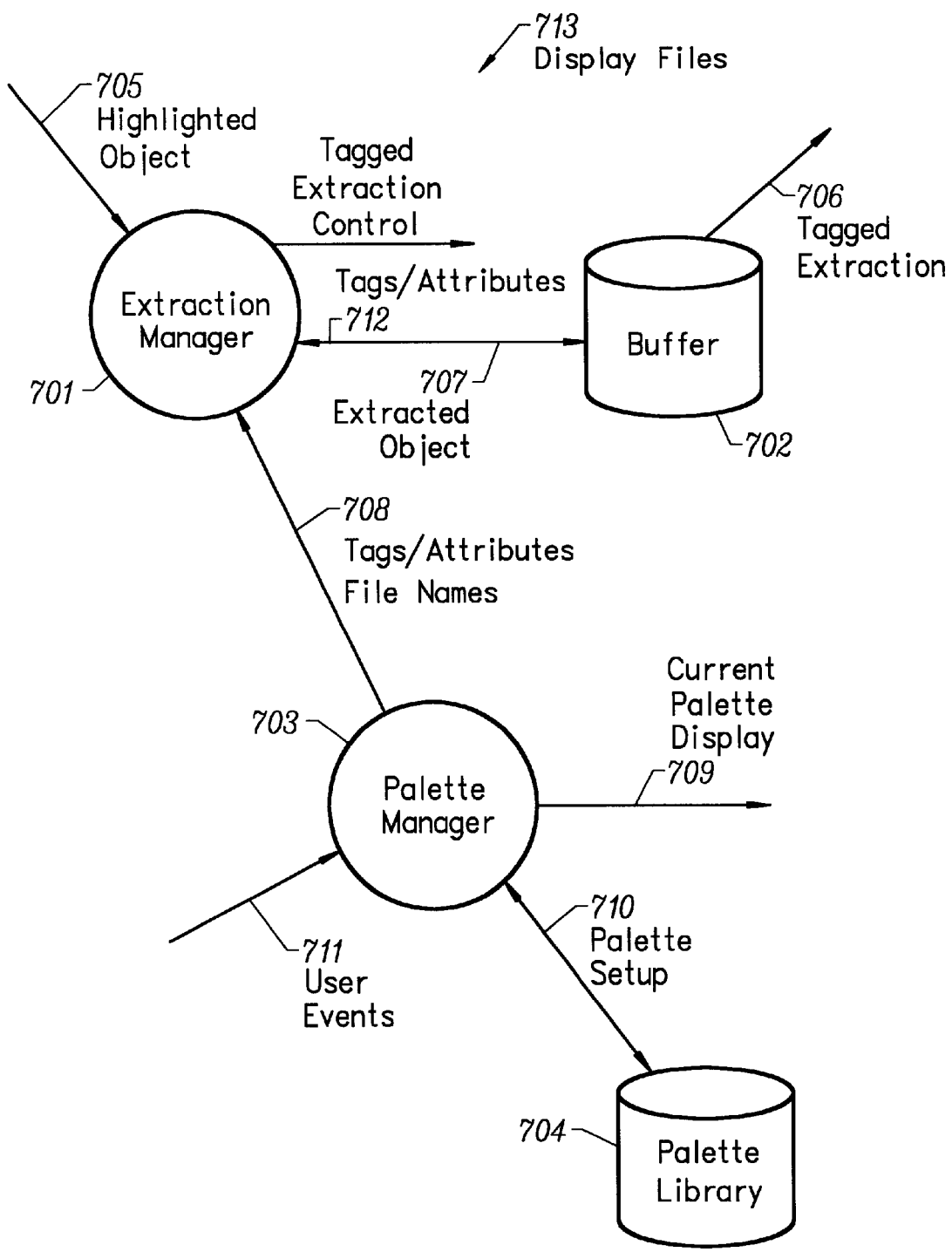
FIG. 7 is a block schematic diagram showing the data paths through a preferred embodiment of the invention according to the invention.

With respect to FIG. 7, the internal structure of the Control Palette consists of a Palette Manager 703 and an Extraction Manager 701. The basic duties of the two modules are as follows:

Palette Manager

Opening palettes.

Editing palette content/buttons/controls.

Editing state information.

Saving palettes.

Processing user events.

Extraction Manager

Opening source files.

Writing selection to buffer.

Managing tagging of extracted text.

Writing to destination files.

Displaying files.

The Palette Manager 703 processes user events 711 which include palette editing commands, text input, and button clicks. The current palette setup is displayed to the user 709. A palette library 704 contains standard and user customized palette setups. Palette setups are retrieved and written 710 to the palette library 704 by the Palette Manager 703. The Palette Manager 703 passes any tags, attributes or file names 708 selected by the user through the user events 711.

The Extraction Manager 701 opens the source files and, upon selection through a highlight, extracts the highlighted object 705 from the source file and writes the extracted object 707 to the buffer 702. Any tags and attributes 712 that the user attaches to the extracted object 707 are written into the buffer 702. When the user has completed all of the changes to the extracted object 707 in the buffer 702, the Extraction Manager 701 writes the tagged extraction 706 from the buffer 702 to any destination file(s) specified by the user. Both source files and destination files may be displayed 713 by the Extraction Manager 701, thereby allowing the user to select the insertion point of the tagged extraction 706 into the destination file(s).

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for extracting, manipulating, and tagging highlighted objects in a source file via a configurable control palette without modifying said source file, comprising the steps of:
    displaying said control palette to a user, wherein said control palette configurations are editable by said user;
    extracting said highlighted objects from said source file into a local buffer;
    processing user events in said local buffer, said user events comprising user creatable events, and wherein said user events modify the properties of said objects; and
    writing the contents of said local buffer to destination files; wherein said destination files comprise said objects in said local buffer as modified by said user.

2. The process of claim 1, further comprising the step of: creating a library of control palette configurations.

3. The process of claim 2, further comprising the step of: configuring said control palette with said control palette configurations selected by said user from said library.

4. The process of claim 1, further comprising the step of: adding tags selected by said user to said objects in said local buffer.

5. The process of claim 1, further comprising the step of: changing the attributes selected by said user of said objects in said local buffer.

6. The process of claim 1, wherein said displaying step further comprises the step of: displaying clickable event buttons on said control palette and editable text fields.

7. The process of claim 1, wherein said displaying step further comprises the step of: displaying state information on said control palette.

8. The process of claim 1, wherein said displaying step further comprises the step of: displaying clickable palette editing buttons on said control palette.

9. The process of claim 1, further comprising the step of: displaying the contents of said source file.

10. The process of claim 1, further comprising the step of: displaying the contents of said destination files.

11. The process of claim 1, further comprising the step of: processing the insertion points from said user where said local buffer is to be written into each of said destination files.

12. The process of claim 1, further comprising the step of: displaying the contents of said local buffer.

13. An apparatus for extracting, manipulating, and tagging highlighted objects in a source file via a configurable control palette without modifying said source file, comprising:
    an extraction manager, said extraction manager comprising a module for extracting said highlighted objects from said source file into a local buffer; and
    a palette manager, said palette manager comprising:
        a module for displaying said control palette to a user, wherein said control palette configurations are editable by said user; and
        a module for processing user events in said local buffer, said user events comprising user creatable events, and wherein said user events modify the properties of said objects; and
    a module for writing the contents of said local buffer to destination files; wherein said destination files comprise said objects in said local buffer as modified by said user.

14. The apparatus of claim 13, further comprising: a library of control palette configurations.

15. The apparatus of claim 14, said palette manager further comprising:
    a module for configuring said control palette with said control palette configurations selected by said user from said library; and
    a module for saving edited control configurations in said library.

16. The apparatus of claim 13, said extraction manager further comprising:
    a module for adding tags selected by said user to said objects in said local buffer.

17. The apparatus of claim 13, said extraction manager further comprising:
    a module for changing the attributes selected by said user of said objects in said local buffer.

18. The apparatus of claim 14, said palette manager further comprising:
    a module for displaying clickable event buttons, checkboxes, and editable text fields on said control palette.

19. The apparatus of claim 14, said palette manager further comprising:
    a module for displaying state information on said control palette.

20. The apparatus of claim 14, said palette manager further comprising:
    a module for displaying clickable palette editing buttons on said control palette.

21. The apparatus of claim 14, said extraction manager further comprising:
    a module for displaying the contents of said source file.

22. The apparatus of claim 13, said extraction manager further comprising:
    a module for displaying the contents of said destination files.

23. The apparatus of claim 13, said extraction manager further comprising:
    a module for processing the insertion points from said user where said local buffer is to be written into each of said destination files.

24. The apparatus of claim 13, said extraction manager further comprising:
    a module for displaying the contents of said local buffer.

* * * * *